United States Patent [19]
Aylward et al.

[11] Patent Number: 6,040,124
[45] Date of Patent: Mar. 21, 2000

[54] IMAGING ELEMENT WITH BIAXIALLY ORIENTED SHEET WITH FLUOROPOLYMER

[75] Inventors: Peter T. Aylward, Hilton; Robert P. Bourdelais, Pittsford; Thaddeus S. Gula, Rochester; Pang-Chia Lu, Pittsford, all of N.Y.

[73] Assignee: Eastman Kodak Company, Rochester, N.Y.

[21] Appl. No.: 09/196,910

[22] Filed: Nov. 20, 1998

[51] Int. Cl.⁷ ........................................ G03C 1/79
[52] U.S. Cl. .................... 430/496; 430/536; 430/538; 430/950; 428/511; 428/523
[58] Field of Search ..................... 430/536, 496, 430/538, 950, 533; 428/511, 523

[56] References Cited

U.S. PATENT DOCUMENTS

| | | |
|---|---|---|
| 4,528,235 | 7/1985 | Sacks et al. . |
| 4,568,598 | 2/1986 | Bilkadi et al. ........................... 428/741 |
| 4,758,462 | 7/1988 | Park et al. . |
| 4,764,425 | 8/1988 | Balloni et al. . |
| 5,435,990 | 7/1995 | Chang et al. . |
| 5,466,519 | 11/1995 | Shirakura et al. . |
| 5,500,282 | 3/1996 | Heffelfinger et al. . |
| 5,514,460 | 5/1996 | Surman et al. . |
| 5,853,965 | 12/1998 | Haydock et al. ........................ 430/496 |
| 5,866,282 | 2/1999 | Bourdelais et al. ....................... 430/22 |
| 5,874,205 | 2/1999 | Bourdelais et al. ..................... 430/496 |

FOREIGN PATENT DOCUMENTS

| | | |
|---|---|---|
| 0 880 065 A1 | 11/1998 | European Pat. Off. . |
| 0 880 067 A1 | 11/1998 | European Pat. Off. . |
| 0 880 069 A1 | 11/1998 | European Pat. Off. . |
| 2 325 749 | 12/1998 | United Kingdom . |
| 2 325 750 | 12/1998 | United Kingdom . |

Primary Examiner—Richard L. Schilling
Assistant Examiner—Amanda C. Walke
Attorney, Agent, or Firm—Paul A. Leipold

[57] ABSTRACT

The invention relates to an imaging element comprising a laminated base comprising a layer of biaxially oriented film sheet adhered to the top surface of a base wherein said biaxially oriented polyolefin contains a photographically compatible fluoropolymer processing aid.

23 Claims, No Drawings

IMAGING ELEMENT WITH BIAXIALLY ORIENTED SHEET WITH FLUOROPOLYMER

FIELD OF THE INVENTION

This invention relates to the formation of laminated substrate for imaging materials. It particularly relates to improved substrates for photographic materials.

BACKGROUND OF THE INVENTION

In the formation of imaging and in particular photographic paper it is known that the paper base is resin coated and on the side contacting the image the resin may contain a white pigment such as $TiO_2$. During the manufacture of the resin coated paper difficulties occur in which the resin is heated to several hundred degrees and pumped through melt processing equipment that has a high level of metal surface area. Difficulties can occur with hot tacky polymer as it flows over these metal surfaces. The polymer tends to stick to these metal parts and can result in lines or other imperfections. These imperfections can result in the loss of significant commercial value or add to the cost to manufacture imaging products.

It has been proposed in U.S. Pat. No. 5,244,861 to utilize biaxially oriented polypropylene sheets laminated to cellulose photographic paper for use as a reflective receiver for the thermal dye transfer imaging process. In the formation of biaxially oriented sheets described in U.S. Pat. No. 5,244,861, a co-extruded layer of polypropylene is cast against a water cooled roller and quenched by either immersion in a water bath or by cooling the melt by circulating chill liquid internal to the chill roll. The sheet is then oriented in the machine direction and in the transverse direction. While a variety of materials may be used to create a biaxially oriented sheet, one of the preferred materials is polypropylene because of its strength and processing properties during the orientation. In addition the cost of this material makes it cost effective to use. One of the problems with polypropylene is that gelatin based coating layers to not adhere to polypropylene polymers as well as to polyethylene polymers. A means to achieve the desired adhesion is to provide a biaxially oriented sheet that has a skin layer of polyethylene. While this helps to resolve the adhesion problem, melt processing problems are encountered during the manufacturing phase of a multi-layer structure. The problem is greatest when the polyethylene is the outer most layer and is in contact with the hot metal surfaces. Polyethylene is relatively tacky in relation to other polymers at the desired processing temperatures and will tend to provide higher frictional resistance against the walls of the extrusion equipment. When this occurs in multi-layer coatings, the drag forces are transmitted into a shear force across the thickness of the polymer layers and can result in melt fracture or slippage within or at the interface of two polymer layers. This creates a defect in the polymer. There remains a need to improve the flow properties of polymer layers in either a mono or multi-layer structure for imaging and in particular photographic applications without encountering adhesion problems between the image layer and the polymer on top of the paper.

In U.S. application Ser. No. 08/862,708 filed May 23, 1997 it has been proposed to use biaxially oriented polyolefin sheets laminated to photographic grade paper as a photographic support for silver halide imaging systems. In U.S. application Ser. No. 08/862,708 filed May 23, 1997 numerous advantages are obtained by the use of the high strength biaxially oriented polyolefin sheets. Advantages such as increased opacity, improved image tear resistance and improved image curl. While all of these photographic improvements are possible with the use of biaxially oriented polyolefin sheets, there is a need to optimize the adhesion of a photographic or image layer to said sheet.

PROBLEM TO BE SOLVED BY THIS INVENTION

There remains a need to provide an imaging support that contains a biaxially oriented polyolefin sheet that has reduced melt fractures and adhesion between the polymer and the image layer.

SUMMARY OF THE INVENTION

An object of the invention is to provide improved imaging materials.

A further object is to provide improved photographic support.

A further object is to provide a base for images that will have improved melt fracture performance.

These and other objects of the invention generally are accomplished by an imaging element comprising a substrate having adhered to each side a biaxially oriented sheet of polyolefin polymer of at least one layer, wherein at least one of the biaxially oriented sheets has incorporated therein an amount of a fluoropolymer processing aid. In a preferred embodiment a photographic imaging element is formed.

ADVANTAGEOUS EFFECT OF THE INVENTION

The invention provides an improved base for the casting of photosensitive and other imaging layers. It particularly provides an improved base for color photographic materials that require excellent adhesion of the image layer to the support while eliminating the concern of melt fracture during the manufacturing process for forming a biaxially oriented sheet. Melt fractures are non-uniformity's in the film surface and generally occur at high viscosity and high shear rates and are a result of a rhythmic stick/slippage of the molten extrudate in the melt processing equipment. The non-uniformity's are a concern because they can create imperfections in the final pictures that are viewed by the customer.

DETAILED DESCRIPTION OF THE INVENTION

There are numerous advantages of the invention over prior practices in the art. Lubricants or slip agents are a class of materials that have been used and added to polymers to improve their melt processability. In the course of forming a biaxially oriented polyolefin sheet the thermoplastic processing is carried out at high temperatures and the molten polymer has high viscosity. As the polymers are conveyed under pressure there is a resistance to the flow of the polymer along the walls of the of the processing equipment. This resistance to flow results in the frictional heating of the polymer which can result in degradation of the polymer or in the case of multilayer polymers it can have an adverse affect on the dispersion quality or can even result in intra and interlayer slippage which can cause melt fracture imperfections or in highly pigmented polymer layers can result in material accumulating on the metal surfaces and cause a flow disturbance.

If this occurs as the polymer is exiting the melt processing equipment, a permanent deformation can be made in the polymer layer. This results in material that is unacceptable and it also adds to the cost of the material, due to high levels of waste. In the case when more than one polymer is mixed with other polymers to create a desired property in the final product, such as the use of blocked copolymers and terpolymers to create a desired level of haze or perhaps roughness, an added level of melt processing complexities is introduced and great care must be taken to assure the proper melt processing properties. This is also critical in the case in which different homo and/or copolymers are processed in a multilayer coating. Depending on the tackiness of the polymers and in particular the polymer in contact with the metal walls of the processing equipment, a transition from laminar flow to a stick-slip flow can occur with higher shear rates. Solving processing problems not only entails a knowledge of the optimum polymer molecular weight, melt index to match the processing conditions, but the use of lubricants to influence the apparent melt rheology and frictional flow characteristics as well as the finished product needs. In the case of an imaging product and in particular photographic products in which the image layer contains gelatin as the large part of the binder system for the silver halide grains, the selection of polymers may be limited by the performance features of the product. In particular the adhesion of the image layer must not only require good dry adhesion but must also standup to processing solutions. During wet processing of photographic images, the gelatin layer swells and if the adhesion properties are not sufficient, the photo layer may begin to delaminate leaving white specs in the image layer. The white specs are areas in which the emulsion has been removed and the white base under the emulsion shows through. This has a very significant negative impact on the commercial value of the product. It has been found that the optimum choice of polymer layer to be in contact with the photographic emulsion is polyethylene. Adhesion studies have shown that low density polyethylene is better than high density.

One problem that occurs with low density polyethylene is that it is relatively tacky and when used either by itself and in particular when used as a top skin layer in a multilayer polymer structure, this tackiness can cause melt fractures to occur during the formation of a biaxially oriented sheet. To overcome this problem a lubricate is added to the polymer system to provide a layer of material that allows the polyehtylene polymer to slide over the hot melt surfaces. The choice of material is important because certain lubricants tend to move to the surface to coat the metal surfaces of the melt processing equipment and will also migrate to the surface of the finished product. The accumulation of these materials on the surface can interfere with the adhesion of the emulsion to the polymer surface. Certain lubricants such as fatty acids and waxes can continue to migrate even after the melt processing step. Parameters that can impact this is the concentration, type of material, storage conditions, such as temperature and even wound roll pressure. Many times this can result in differential migration of the lubricant to the surface that will be coated by the silver halide or image forming layer. There can be localized areas of poor emulsion adhesion. With the use of fluoropolymer in the polymer layers, the unobvious result is the achieving of excellent melt processing conditions that are free of melt fractures and other problems while still obtaining excellent adhesion of the image layer to the top layer of the biaxially oriented support. Any suitable fluoropolymer processing aid can be used in the invention. The suitable ones include polytetrafluoroethylene, but the preferred ones are copolymers that contain vinylidene fluoride that typically melts within the same temperature range as the co-extruded polymers such as low density polyolefins. This helps to optimize the extrusion process by allowing the melt processing aid to coat the metal surfaces. This further enables multiple streams of molten polymer of differing viscosities to be processed as adjacent layers without melt fractures or discontinuities within or between the layers.

These and other objects of the invention will be apparent from the detailed description below.

The terms as used herein, "top," "upper," "emulsion side" and "face" mean the side or towards the side of a imaging member bearing the imaging layers. The terms "bottom," "lower side," and "back" mean the side or towards the side of the imaging member opposite from the side bearing the imaging layers or developed image. The term "tie layer" as used herein refers to a layer of material that is used to adhere a biaxially oriented polymer sheet to a base such as paper, polyester, fabric or other suitable support material for the viewing of images.

Any suitable biaxially oriented polyolefin sheet may be used for the sheet on the top side of the laminated base used in the invention. Microvoided composite biaxially oriented sheets are preferred and are conveniently manufactured by co-extrusion of the core and surface layers, followed by biaxially orientation, whereby voids are formed around void-initiating material contained in the core layer. Such composite sheets may be formed as in U.S. Pat. Nos. 4,377,616; 4,758,462 and 4,632,869.

The core of the preferred composite sheet should be from 15 to 95% of the total thickness of the sheet, preferably from 30 to 85% of the total thickness. The non-voided skin(s) should thus be from 5 to 85% of the sheet, preferably from 15 to 70% of the thickness.

The density (specific gravity) of the composite sheet, expressed in terms of "percent of solid density" is calculated as follows:

$$\frac{\text{Composite Sheet Density}}{\text{Polymer Density}} \times 100 = \% \text{ of Solid Density}$$

Percent solid density should be between 45% and 100%, preferably between 67% and 100%. As the percent solid density becomes less than 67%, the composite sheet becomes less manufacturable due to a drop in tensile strength and it becomes more susceptible to physical damage.

The total thickness of the composite sheet can range from 12 to 100 $\mu$m, preferably from 20 to 70 $\mu$m. Below 20 $\mu$m, the microvoided sheets may not be thick enough to minimize any inherent non-planarity in the support and would be more difficult to manufacture. At thickness higher than 70 $\mu$m, little improvement in either surface smoothness or mechanical properties are seen, and so there is little justification for the further increase in cost for extra materials.

In the preferred embodiment a sheet of biaxially oriented polyolefin polymer of at least one layer is attached to both the top and bottomsides of an imaging quality paper substrate by melt extrusion of adhesive between the paper and the sheet, and the said sheet contains an amount of fluoropolymer processing aid. Processing aids are necessary within melt processing equipment to provide adequate flow and slip properties between the melt processing equipment and the polymer. They help to provide adequate slippage between the walls of the equipment and the polymer. This often occurs as the processing aide coats the metal surfaces of the equipment as well as providing a surface tension change within the melt polymer. This is necessary to prevent degraded polymer from sticking to the walls of the processing equipment as well as to assure that the frictional characteristics at the wall are sufficiently close to that of the various layer interfaces in the case of co-extrusion or of the bulk polymer. By doing this melt fractures or inter and intra layer slippage is greatly minimized thus assuring the quality of said sheet and final use within an imaging element. While there are many different types and classes of slip agents or lubricants that are used in the polymer processing industry many of these are limited in the amount that can be added within an imaging element because of their tendency to migrate to the polymer surface. The migration of these materials can often interfere with the adhesion of the imaging layer to said sheet as well as the adhesion of said sheet to the tie layer or to the substrate. Even in the case when the topmost layer is polyethylene, which is the preferred polymer to be in contact with the imaging layer and in particular when the imaging layer contains silver halide with dye forming couplers, which also contains gelatin and is wet processed, the selection of processing aids is very important to assure adequate adhesion and thus preventing problems that may lead to adverse customer reactions. The present invention consists of a sheet of biaxially oriented polyolefin sheet that is adhered to both the top and bottom of a photographic paper base, and said sheets contain a fluoropolymer processing aid in the amount of about 0.01 to 3% by weight. The preferred embodiment of said imaging element contains a fluoropolymer processing aid in the amount of about 0.1 to 0.5% by weight. This range provides excellent processability during the melt extrusion and co-extrusion of said sheet. In addition it has been shown that the adhesion of a photographic imaging layer is excellent over this range and the processing aid does not interfere with the wet processing of the final image or photofinishing operations.

"Void" is used herein to mean devoid of added solid and liquid matter, although it is likely the "voids" contain gas. The void-initiating particles which remain in the finished packaging sheet core should be from 0.1 to 10 $\mu$m in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is pre-shaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical; acrylate-type monomers include monomers of the formula CH$_2$=C(R')—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series HO(CH$_2$)$_n$OH wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethyl-propane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

For the biaxially oriented sheet on the top side toward the emulsion, suitable classes of thermoplastic polymers for the biaxially oriented sheet and the core matrix-polymer of the preferred composite sheet comprise polyolefins.

Suitable polyolefins include polypropylene, polyethylene, polymethylpentene, polystyrene, polybutylene and mixtures thereof. Polyolefin copolymers, including copolymers of propylene and ethylene hexene, butene and octene are also useful. Polypropylene is preferred, as it is low in cost and has desirable strength properties.

The non-voided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

Addenda may be added to the core matrix and/or to the skins to improve the whiteness of these sheets. This would include any process which is known in the art including adding a white pigment, such as titanium dioxide, barium sulfate, clay, or calcium carbonate. This would also include adding fluorescing agents, which absorb energy in the UV region and emit light largely in the blue region, or other additives which would improve the physical properties of the sheet or the manufacturability of the sheet. For photographic use, a white base with a slight bluish tint is preferred.

The co-extrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

The composite sheet, while described as having preferably at least three layers of a microvoided core and a skin layer on each side, may also be provided with additional layers that may serve to change the properties of the biaxially oriented sheet. A different effect may be achieved by additional layers. Such layers might contain tints, antistatic materials, or different void-making materials to produce sheets of unique properties. Biaxially oriented sheets could be formed with surface layers that would provide an improved adhesion, or look to the support and photographic element. The biaxially oriented extrusion could be carried out with as many as 10 or more layers if desired to achieve some particular desired property.

These composite sheets may be coated or treated after the co-extrusion and orienting process or between casting and full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability, coating polyvinylidene chloride for heat seal properties. Further examples include flame, plasma or corona discharge treatment to improve printability or adhesion.

By having at least one non-voided skin on the microvoided core, the tensile strength of the sheet is increased and makes it more manufacturable. It allows the sheets to be made at wider widths and higher draw ratios than when sheets are made with all layers voided. Co-extruding the layers further simplifies the manufacturing process.

The structure of a typical topside biaxially oriented, sheet of the invention is as follows:

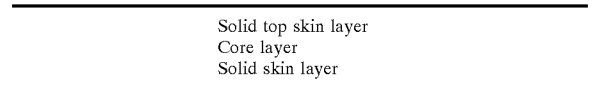

Solid top skin layer
Core layer
Solid skin layer

The sheet on the side of the base paper opposite to the emulsion layers may be any suitable sheet. The sheet may or may not be microvoided. It may have the same composition as the sheet on the topside of the paper backing material. Biaxially oriented sheets are conveniently manufactured by co-extrusion of the sheet, which may contain several layers, followed by biaxial orientation. Such biaxially oriented sheets are disclosed in, for example, U.S. Pat. No. 4,764,425, the disclosure of which is incorporated for reference. The preferred biaxially oriented backside sheet is a biaxially oriented polyolefin sheet, most preferably a sheet of polyethylene or polypropylene. The thickness of the biaxially oriented sheet should be from 15 to 70 $\mu$m. Below 15 $\mu$m, the sheets may not be thick enough to minimize any inherent non-planarity in the support and would be more difficult to manufacture. At thicknesses higher than 70 $\mu$m, little improvement in either surface smoothness or mechanical properties are seen, and so there is little justification for the further increase in cost for extra materials.

Suitable classes of thermoplastic polymers for the biaxially oriented sheet include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used. Suitable polyolefins include polypropylene, polyethylene, polymethylpentene, and mixtures thereof. Polyolefin copolymers, including copolymers of propylene and ethylene, hexene, butene and octene are also useful. Polypropylenes are preferred because they are low in cost and have good strength and surface properties.

Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well known techniques, e.g., those described in U.S. Pat. Nos. 2,465,319 and 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607, 4,459,402 and 4,468,510.

Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The biaxially oriented sheet on the backside of the laminated base can be made with layers of the same polymeric material, or it can be made with layers of different polymeric composition. For compatibility, an auxiliary layer can be used to promote adhesion of multiple layers.

Addenda may be added to the biaxially oriented backside sheet to improve the whiteness of these sheets. This would include any process which is known in the art including adding a white pigment, such as titanium dioxide, barium sulfate, clay or calcium carbonate. This would also include adding fluorescing agents which absorb energy in the UV region and emit light largely in the blue region, or other additives which would improve the physical properties of the sheet or the manufacturability of the sheet.

The co-extrusion, quenching, orienting, and heat setting of these backside biaxially oriented sheets may be effected by any process which is known in the art for producing oriented sheet, such as by a flat sheet process or a bubble or tubular process. The flat sheet process involves extruding or co-extruding the blend through a slit die and rapidly quenching the extruded or co-extruded web upon a chilled casting drum so that the polymer component(s) of the sheet are quenched below their solidification temperature. The quenched sheet is then biaxially oriented by stretching in mutually perpendicular directions at a temperature above the glass transition temperature of the polymer(s). The sheet may be stretched in one direction and then in a second direction or may be simultaneously stretched in both directions. After the sheet has been stretched, it is heat set by heating to a temperature sufficient to crystallize the polymers while restraining to some degree the sheet against retraction in both directions of stretching.

The biaxially oriented sheet on the backside of the laminated base, while described as having preferably at least one layer, may also be provided with additional layers that may serve to change the properties of the biaxially oriented sheet. A different effect may be achieved by additional layers. Such layers might contain tints, antistatic materials, or slip agents to produce sheets of unique properties. Biaxially oriented sheets could be formed with surface layers that would provide an improved adhesion, or look to the support and photographic element. The biaxially oriented extrusion could be carried out with as many as 10 layers if desired to achieve some particular desired property.

These biaxially oriented backside sheets may be coated or treated after the co-extrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability, coating polyvinylidene chloride for heat seal properties. Further examples include flame, plasma or corona discharge treatment to improve printability or adhesion.

The structure of a typical biaxially oriented sheet that may be laminated to the opposite side of the imaging elements is as follows:

Side Opposite image layer
treated skin layer
solid core layer

The support to which the microvoided composite sheets and biaxially oriented sheets are laminated for the laminated support of the photosensitive silver halide layer may be a polymeric, a synthetic paper, cloth, woven polymer fibers, or a cellulose fiber paper support, or laminates thereof. The base also may be a microvoided polyethylene terephalate such as disclosed in U.S. Pat. Nos. 4,912,333, 4,994,312 and 5,055,371.

The preferred support is a photographic grade cellulose fiber paper. When using a cellulose fiber paper support, it is preferable to extrusion laminate the microvoided composite sheets to the base paper using a polyolefin resin. Extrusion laminating is carried out by bringing together the biaxially oriented sheets of the invention and the base paper with application of an adhesive between them followed by their being pressed in a nip such as between two rollers. The adhesive may be applied to either the biaxially oriented sheets or the base paper prior to their being brought into the nip. In a preferred form the adhesive is applied into the nip simultaneously with the biaxially oriented sheets and the base paper. The adhesive may be any suitable material that does not have a harmful effect upon the photographic element. A preferred material is polyethylene that is melted at the time it is placed into the nip between the paper and the biaxially oriented sheet.

During the lamination process, it is desirable to maintain control of the tension of the biaxially oriented sheets in order to minimize curl in the resulting laminated support. For high humidity applications (>50% RH) and low humidity applications (<20% RH), it is desirable to laminate both a front side and backside film to keep curl to a minimum.

The surface roughness of this invention can also be accomplished by laminating a biaxially oriented sheet to a paper base that has the desired roughness. The roughness of the paper base can be accomplished by any method known in the art such as a heated impression nip or a press felt combined with a roller nip in which the rough surface is part of the press nip. The preferred roughness of the base paper is from 35 $\mu$m to 150 $\mu$m. This preferred range is larger than roughness range for the imaging support because of the loss of roughness that occurs in melt extrusion lamination of the biaxially oriented sheet to the paper.

In one preferred embodiment, in order to produce photographic elements with a desirable photographic look and feel, it is preferable to use relatively thick paper supports (at least 120 $\mu$m thick, preferably from 120 to 250 $\mu$m thick) and relatively thin microvoided composite sheets (less than 50 $\mu$m thick, preferably from 20 to 50 $\mu$m thick, more preferably from 30 to 50 $\mu$m thick). The preferred thickness results in the most desirable look and feel.

The addition of the fluoropolymer processing aid should be in at least one layer of a biaxially oriented sheet that contains a plurality of layers but usually is most effective when it is in more than one layer. The amount of said processing aid may be adjusted between layers to better optimize the flow properties of the polymers during co-extrusion and sheet orientation. In the preferred case in which the outer most layer of said sheet is different than the inter layers and in particular when the outer layer is a homo or copolymer of ethylene, polyester or other polymers such as ethylene vinyl alcohol it is important to assure that the viscosity/shear behavior of layer are sufficiently matched to prevent, layer slippage within the polymer as well as between the polymer and melt processing equipment. Depending on the viscosity match between the layers, it may also be necessary to provide said layer with an amount of photographically compatible fluoropolymer processing aid to eliminate melt fractures. Without this material the polymer layers produce an unacceptable layer for viewing imaged prints.

It is preferred that the imaging element contains a photographic paper base to which a typical biaxially oriented sheet that contains at least one layer in which the layer is voided and the top sheet contains at least one additional layer that contains $TiO_2$ and a biaxially oriented sheet on the bottom side of said element that has a bottom surface that has roughness for writeability.

It is further recognized that the addition of other processing aids such as metallic soaps, oligomeric fatty esters, fatty alcohol acid esters, polyolefin waxes, fatty acid esters of glycerol, dicarboxylic acid ester of fatty alcohols and even fatty acid amides may be used in combination with fluoropolymers or by themselves in lower layers of a biaxially oriented polymer sheet if the levels are kept sufficient low to minimize their interaction with the emulsion.

As used herein the phrase "imaging element" is a material that may be used as a laminated support for the receiving of images onto the support by techniques such as ink jet printing or thermal dye transfer as well as a support for silver halide images. As used herein, the phrase "photographic element" is a material that utilizes photosensitive silver halide in the formation of images. In the case of thermal dye transfer or ink jet, the image layer that is coated on the imaging element may be any material that is known in the art such as gelatin, pigmented latex, polyvinyl alcohol, polycarbonate, polyvinyl pyrrolidone, starch and methacrylate. The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as: sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating and extrusion coating.

The silver halide emulsions utilized in this invention may be comprised of any halide distribution. Thus, they may be comprised of silver chloride, silver chloroiodide, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride, and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in *The Theory of the Photographic Process*, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23,113 (1979). Examples of processes for preparing intentionally reduction sensitized silver halide emulsions are described in EP 0 348934 A1 (Yamashita), EP 0 369491 (Yamashita), EP 0 371388 (Ohashi), EP 0 396424 A1 (Takada), EP 0 404142 A1 (Yamada), and EP 0 435355 A1 (Makino).

The photographic elements of this invention may use emulsions doped with Group VIII metals such as iridium, rhodium, osmium, and iron as described in *Research Disclosure*, September 1996, Item 38957, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black and white photographic print elements.

The photographic elements may also contain a transparent magnetic recording layer such as a layer containing magnetic particles on the underside of a transparent support, as in U.S. Pat. No. 4,279,945 and 4,302,523. Typically, the element will have a total thickness (excluding the support) of from about 5 to about 30 µm.

In the following Table, reference will be made to (1) *Research Disclosure*, December 1978, Item 17643, (2) *Research Disclosure*, December 1989, Item 308119, and (3) *Research Disclosure*, September 1996, Item 38957, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing and manipulating the elements, and the images contained therein.

| Reference | Section | Subject Matter |
|---|---|---|
| 1 | I, II | Grain composition, |
| 2 | I, II, IX, X, XI, XII, XIV, XV | morphology and preparation. Emulsion preparation including |
|  | I, II, III, IX | hardeners, coating aids, |
| 3 | A & B | addenda, etc. |
| 1 | III, IV | Chemical sensitization and |
| 2 | III, IV | spectral sensitization/ |
| 3 | IV, V | desensitization |
| 1 | V | UV dyes, optical |
| 2 | V | brighteners, luminescent |
| 3 | VI | dyes |
| 1 | VI | Antifoggants and |
| 2 | VI | stabilizers |
| 3 | VII |  |
| 1 | VIII | Absorbing and scattering |

-continued

| Reference | Section | Subject Matter |
|---|---|---|
| 2 | VIII, XIII, XVI | materials; Antistatic layers; matting agents |
| 3 | VIII, IX C & D |  |
| 1 | VII | Image-couplers and image- |
| 2 | VII | modifying couplers; Dye |
| 3 | X | stabilizers and hue modifiers |
| 1 | XVII | Supports |
| 2 | XVII |  |
| 3 | XV |  |
| 3 | XI | Specific layer arrangements |
| 3 | XII, XIII | Negative working emulsions; Direct positive emulsions |
| 2 | XVIII | Exposure |
| 3 | XVI |  |
| 1 | XIX, XX | Chemical processing; |
| 2 | XIX, XX, XXII | Developing agents |
| 3 | XVIII, XIX, XX |  |
| 3 | XIV | Scanning and digital processing procedures |

The photographic elements can be exposed with various forms of energy which encompass the ultraviolet, visible and infrared regions of the electromagnetic spectrum as well as with electron beam, beta radiation, gamma radiation, X ray, alpha particle, neutron radiation, and other forms of corpuscular and wave-like radiant energy in either non-coherent (random phase) forms or coherent (in phase) forms, as produced by lasers. When the photographic elements are intended to be exposed by x-rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4™ (Eastman Kodak Company) Process or other processing systems suitable for developing high chloride emulsions.

The laminated substrate of the invention may have copy restriction features incorporated such as disclosed in U.S. patent application Ser. No. 08/598,785 filed Feb. 8, 1996 and U.S. Pat. No. 5,752,152. These applications disclose rendering a document copy restrictive by embedding into the document a pattern of invisible microdots. These microdots are, however, detectable by the electro-optical scanning device of a digital document copier. The pattern of microdots may be incorporated throughout the document. Such documents may also have colored edges or an invisible microdot pattern on the backside to enable users or machines to read and identify the media. The media may take the form of sheets that are capable of bearing an image. Typical of such materials are photographic paper and film materials composed of polyethylene resin coated paper, polyester, (poly)ethylene naphthalate, and cellulose triacetate based materials.

The microdots can take any regular or irregular shape with a size smaller than the maximum size at which individual microdots are perceived sufficiently to decrease the usefulness of the image, and the minimum level is defined by the detection level of the scanning device. The microdots may be distributed in a regular or irregular array with center-to-center spacing controlled to avoid increases in document density. The microdots can be of any hue, brightness, and saturation that does not lead to sufficient detection by casual observation, but preferably of a hue least resolvable by the human eye, yet suitable to conform to the sensitivities of the document scanning device for optimal detection.

In one embodiment the information-bearing document is comprised of a support, an image-forming layer coated on the support and pattern of microdots positioned between the support and the image-forming layer to provide a copy restrictive medium. Incorporation of the microdot pattern into the document medium can be achieved by various printing technologies either before or after production of the original document. The microdots can be composed of any colored substance, although depending on the nature of the document, the colorants may be translucent, transparent, or opaque. It is preferred to locate the microdot pattern on the support layer prior to application of the protective layer, unless the protective layer contains light scattering pigments. Then the microdots should be located above such layers and preferably coated with a protective layer. The microdots can be composed of colorants chosen from image dyes and filter dyes known in the photographic art and dispersed in a binder or carrier used for printing inks or light-sensitive media.

In a preferred embodiment the creation of the microdot pattern as a latent image is possible through appropriate temporal, spatial, and spectral exposure of the photosensitive materials to visible or non-visible wavelengths of electromagnetic radiation. The latent image microdot pattern can be rendered detectable by employing standard photographic chemical processing. The microdots are particularly useful for both color and black-and-white image-forming photographic media. Such photographic media will contain at least one silver halide radiation sensitive layer, although typically such photographic media contain at least three silver halide radiation sensitive layers. It is also possible that such media contain more than one layer sensitive to the same region of radiation. The arrangement of the layers may take any of the forms known to one skilled in the art, as discussed in Research Disclosure 37038 of February 1995.

Commercial Grade Paper of Examples

A photographic paper support was produced by refining a pulp furnish of 50% bleached hardwood kraft, 25% bleached hardwood sulfite, and 25% bleached softwood sulfite through a double disk refiner, then a Jordan conical refiner to a Canadian Standard Freeness of 200 cc. To the resulting pulp furnish was added 0.2% alkyl ketene dimer, 1.0% cationic cornstarch, 0.5% polyamide-epichlorohydrin, 0.26 anionic polyacrylamide, and 5.0% $TiO_2$ on a dry weight basis. An about 46.5 lbs. per 1000 sq. ft. (ksf) bone dry weight base paper was made on a fourdrinier paper machine, wet pressed to a solid of 42%, and dried to a moisture of 10% using steam-heated dryers achieving a Sheffield Porosity of 160 Sheffield Units and an apparent density 0.70 g/cc. The paper base was then surface sized using a vertical size press with a 10% hydroxyethylated cornstarch solution to achieve a loading of 3.3 wt. % starch. The surface sized support was calendered to an apparent density of 1.04 gm/cc.

The following examples illustrate the practice of this invention. They are not intended to be exhaustive of all possible variations of the invention. Parts and percentages are by weight unless otherwise indicated.

Samples A–E

The following laminated photographic bases in Table I were prepared by extrusion laminating several biaxially oriented sheets to the emulsion side of the photographic grade cellulose paper base and one biaxially oriented sheet to the backside of the photographic grade cellulose paper base.

The following sheet was laminated to a photographic grade cellulose paper base:

Bottom sheet: (backside)

BICOR 70 MLT (Mobil Chemical Co.), a one-side matte finish, one-side treated biaxially oriented polypropylene sheet (18 $\mu$m thick) (d=0.9 g/cc) consisting of a solid oriented polypropylene core next to the melt extruded tie layer and a skin layer of a copolymer of ethylene, propylene and butylene.

Top Side: (emulsion side)

A biaxially oriented polypropylene sheet of 1.4 mils thickness containing a layer of polypropylene that contains approximately 18% $TiO_2$, a thin layer of low density polyethylene which is on the topside in contact with the image layer, a voided core and a layer of solid homopolymer of polypropylene on the side of the sheet that is in contact with a melt extruded tie layer. Said biaxially oriented sheet contains varying amounts of a melt processing aid in at least the polyethylene layer, the pigmented layer and the voided core as indicated in Table 1 samples A–E.

Sample F (Control)

Sample F is a resin coated control in which an extrusion grade low density polyethylene with a density of 0.923 g/cm3 and a melt index of 4.2 and containing approximately 12% $TiO_2$ and processing aid of 0.1% of a stearyl erucamide.

The photographic bases in Table I were prepared by melt extrusion laminating using 1924P Low Density Polyethylene (Eastman Chemical Co.) (an extrusion grade low density polyethylene with a density of 0.923 g/cm3 and a melt index of 4.2) as the bonding layer. Both the top sheet and bottom sheets were laminated to a photographic grade cellulose paper. Photographic bases A–E were emulsion coated using a color silver halide system. These example and the control were then coated with a gelatin based photographic emulsion. Samples of this were then taken and evaluated for both wet and dry adhesion.

The dry adhesion was assessed for adhesion by using a piece of Scotch Brand tape Type 610. The tape was applied to the edge of emulsion and laminated base structure with moderate pressure of the thumb to remove air and to assure uniform contact to the emulsion. The tape extending over the edge is then taken in one hand, and fingers from the other hand are used to hold the coated structure down on both sides of the tape. With a sharp, even force the tape is quickly snapped off. The relative amount of adhesion is judged by examining the tape for the presence of emulsion or pieces of the laminate film or fibers from the paper base stock. Poor or inadequate dry adhesion is judged when either the laminate and emulsion or paper fiber are seen on the sticky side of the tape. A second test with tape is performed by scribing the emulsion with a sharp instrument (such as an edge of a paper clip). Scotch tape is applied over the scribe mark with moderate pressure to assure uniform adhesion. With a free end of the tape in one hand and the laminated structure held down with the other, the tape is sharply removed and again examined for evidence of emulsion, film layer, or paper fiber pull. This is also known as dry tape adhesion. A third test for adhesion (wet/redry) was also run in which the emulsion coated photographic sheet was wet in standard RA4 processing, dried, and then tested for adhesion. A fourth test in which the emulsion coated base is placed in a bath of developer for 45 sec. and then subjected to a scribe test (known as frill) in which a series of stylus of the same point geometry, but with a gradation of weights is placed on the wet emulsion surface. The styli are then pulled across the wet emulsion surface, and the point of scribing into the emulsion is determined or in the case when weak adhesion between the emulsion gel layer and the surface skin, the emulsion will then pick or peel off in varying degrees. The emulsion adhesion is rated on a 1–10 scale. A "1" rating has no evidence of disturbance of the emulsion while a "10" rating has large areas in which the emulsion has been removed from the test sample and is unacceptable.

TABLE 1

| Sample | Processing Aid | Level % | Dry Tape | Wet/Redry* | Frill | Melt Fractures |
|---|---|---|---|---|---|---|
| A | Fluoropolymer | 0.06 | P | P | 1 | Acceptable |
| B | Fluoropolymer | 0.15 | P | P | 1 | Acceptable |
| C | Fluoropolymer | 0.24 | P | P | 1 | Acceptable |
| D | Fluoropolymer | 0.33 | P | P | 2 | Acceptable |
| E(control) | None | 0 | P | P | 1 | Unacceptable |
| F(control) | stearyl erucamide | 0.1 | P− | N | 10 | Not rated |

*P = passable, P− = still passable but slightly different, N = not acceptable

By the table above it is shown that fluoropolymer processing aids can be used at much higher levels than other processing aids while not interfering with emulsion adhesion and also providing polymer sheets that are acceptable for melt fractures.

|  | Coating Format 1 | Laydown mg/m² |
|---|---|---|
| Layer 1 | Blue Sensitive Layer | |
| | Gelatin | 1300 |
| | Blue sensitive silver | 200 |
| | Y-1 | 440 |
| | ST-1 | 440 |
| | S-1 | 190 |
| Layer 2 | Interlayer | |
| | Gelatin | 650 |
| | SC-1 | 55 |
| | S-1 | 160 |
| Layer 3 | Green Sensitive Layer | |
| | Gelatin | 1100 |
| | Green sensitive silver | 70 |
| | M-1 | 270 |
| | S-1 | 75 |
| | S-2 | 32 |
| | ST-2 | 20 |
| | ST-3 | 165 |
| | ST-4 | 530 |
| Layer 4 | UV Interlayer | |
| | Gelatin | 635 |
| | UV-1 | 30 |
| | UV-2 | 160 |
| | SC-1 | 50 |
| | S-3 | 30 |
| | S-1 | 30 |
| Layer 5 | Red Sensitive Layer | |
| | Gelatin | 1200 |
| | Red sensitive silver | 170 |
| | C-1 | 365 |
| | S-1 | 360 |
| | UV-2 | 235 |
| | S-4 | 30 |
| | SC-1 | 3 |
| Layer 6 | UV Overcoat | |
| | Gelatin | 440 |
| | UV-1 | 20 |
| | UV-2 | 110 |
| | SC-1 | 30 |
| | S-3 | 20 |
| | S-1 | 20 |
| Layer 7 | SOC | |
| | Gelatin | 490 |
| | SC-1 | 17 |
| | SiO₂ | 200 |
| | Surfactant | 2 |

APPENDIX

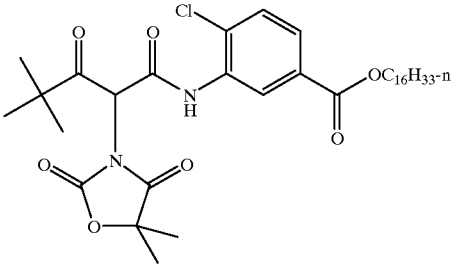

Y-1

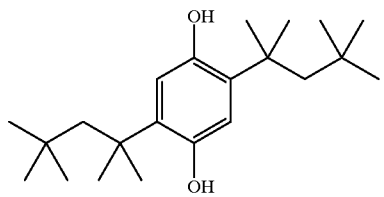

ST-1 = N-tert-butylacrylamide/n-butyl acrylate copolymer (50:50)
S-1 = dibutyl phthalate

SC-1

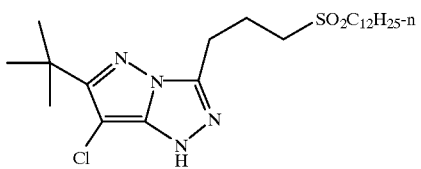

M-1

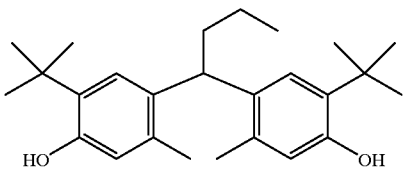

S-2 = diundecyl phthalate

ST-2

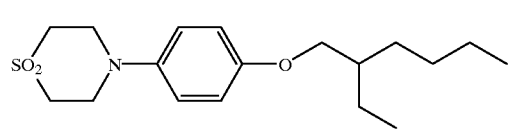

ST-3

ST-4

-continued

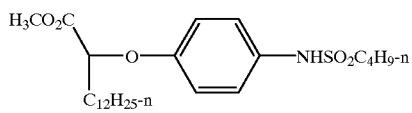

UV-1

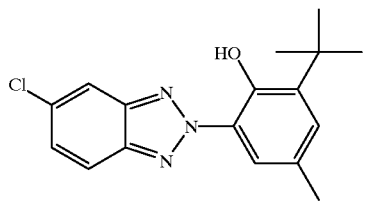

UV-2

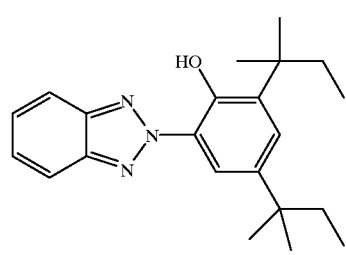

S-3 = 1,4-Cyclohexyldimethylene bis(2-ethylhexanoate)

C-1

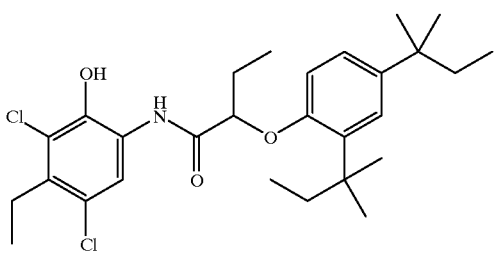

S-4 = 2-(2-Butoxyethoxy)ethyl acetate

Dye 1

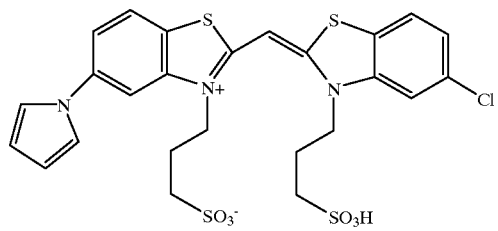

The invention has been described in detail with particular reference to certain preferred embodiments thereof, but it will be understood that variations and modifications can be effected within the spirit and scope of the invention.

What is claimed is:

1. An imaging element comprising a substrate having adhered to each side a biaxially oriented sheet of polyolefin polymer of at least one layer, wherein at least one of the biaxially oriented sheets has incorporated therein an amount of a fluoropolymer processing aid, and wherein said fluoropolymer is in the amount of about 0.01% to 3% by weight of said at least one sheet.

2. The element of claim 1 wherein the said range of fluoropolymer is in the range of about 0.1 to 0.5% by weight.

3. The element of claim 2 wherein said fluoropolymer is poly vinylidene fluoride.

4. The element of claim 1 wherein said at least one biaxially oriented polyolefin sheet has voids in at least one layer.

5. The element of claim 1 wherein said at least one biaxially oriented polyolefin sheet has white pigment in at least one layer.

6. The element of claim 1 wherein the processing aid is located in at least one layer of at least one biaxially oriented polyolefin sheet.

7. The element of claim 5 wherein the layers containing the fluoropolymer comprise the top skin layer directly under an image receiving layer and above a voided core.

8. The element of claim 7 wherein said top skin layer is polyethylene.

9. The element of claim 1 wherein said at least one biaxially oriented sheet also contains at least one layer of material selected from the group consisting of homo and copolymer of ethylene, homo and copolymers of polyester and ethylene vinyl alcohol.

10. The element of claim 8 wherein said top skin layer contains said fluoropolymer processing aid.

11. The element of claim 1 further comprising an image layer and said image layer comprises an image receiving layer comprising gelatin.

12. The element of claim 1 wherein the substrate that said biaxially oriented sheets are adhered to comprises paper.

13. The element of claim 1 wherein said substrate comprises cellulose fiber paper.

14. The element of claim 5 further comprising an image receiving layer consisting of at least one material selected from the group consisting of pigmented latex polyvinyl alcohol, polycarbonate polyvinyl pyrrolidone, starch, and methacrylate.

15. A photographic imaging element comprising at least one silver halide containing imaging layer and a substrate wherein said substrate has adhered to each side a biaxially oriented sheet of polyolefin polymer of at least one layer, wherein at least one of the biaxially oriented sheets has incorporated therein an amount of a fluoropolymer processing aid, and wherein said fluoropolymer is in the amount of about 0.01% to 3% by weight of said at least one sheet.

16. The photographic element of claim 15 wherein the said range of fluoropolymer is in the range of about 0.1 to 0.5% by weight.

17. The photographic element of claim 15 wherein said fluoropolymer is poly vinylidene fluoride.

18. The element of claim 15 wherein said at least one biaxially oriented polyolefin sheet has white pigment in at least one layer.

19. The element of claim 17 wherein a layer containing the fluoropolymer comprises the top skin layer directly under the image layer and the voided core.

20. The element of claim 18 wherein said top skin layer is polyethylene.

21. The element of claim 19 wherein said top layer also contains a fluoropolymer processing aid.

22. The element of claim 15 wherein said substrate comprises cellulose fiber paper.

23. The element of claim 15 wherein said at least one silver halide imaging layer further comprises dye forming coupler.

* * * * *